(12) United States Patent
Brown (10) Patent No.: US 8,544,929 B2
(45) Date of Patent: Oct. 1, 2013

(54) ADJUSTABLE PACKAGE TRAY FOR RECLINING/FOLDING REAR SEATS

(75) Inventor: Keith Brown, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 13/151,747

(22) Filed: Jun. 2, 2011

(65) Prior Publication Data
US 2012/0306228 A1 Dec. 6, 2012

(51) Int. Cl.
B60R 13/04 (2006.01)

(52) U.S. Cl.
USPC ................. 296/37.16; 296/24.44

(58) Field of Classification Search
USPC ............ 296/24.4, 24.43, 24.44, 37.16, 69, 296/65.09, 65.16
See application file for complete search history.

(56) References Cited

U.S. PATENT DOCUMENTS

| 6,702,355 | B1 * | 3/2004 | Price et al. | 296/37.16 |
| 6,802,558 | B2 * | 10/2004 | Matsuoka | 296/203.04 |
| 7,080,867 | B2 * | 7/2006 | Woerner et al. | 296/37.16 |
| 7,093,885 | B2 * | 8/2006 | Guillez et al. | 296/107.08 |
| 7,396,063 | B2 * | 7/2008 | Warsi et al. | 296/24.44 |
| 8,172,296 | B2 * | 5/2012 | Umeda et al. | 296/24.44 |
| 8,322,773 | B2 * | 12/2012 | Parnaik et al. | 296/37.16 |
| 2008/0258504 | A1 * | 10/2008 | Sakane et al. | 296/193.08 |
| 2009/0322113 | A1 * | 12/2009 | Parnaik et al. | 296/37.16 |
| 2012/0306228 | A1 * | 12/2012 | Brown | 296/37.16 |

FOREIGN PATENT DOCUMENTS

| DE | 3602298 | * 7/1987 |
| JP | 7277084 A | 10/1995 |
| JP | 2002104073 A | 4/2002 |
| JP | 2005035428 A | 2/2005 |
| KR | 20050049045 A | 5/2005 |

* cited by examiner

Primary Examiner — Glenn Dayoan
Assistant Examiner — Gregory Blankenship
(74) Attorney, Agent, or Firm — Vichit Chea; Price Heneveld LLP (57) ABSTRACT

A vehicle package tray having a horizontal member extending across a back portion of a vehicle. A tray cover is operably coupled with and slidable relative to the horizontal member. The tray cover includes a rear substrate that extends over the horizontal member. A front substrate is slidably engaged with the rear substrate and adapted for abutment with a seat back. A spring-biased member is disposed between the horizontal member and the front substrate.

17 Claims, 7 Drawing Sheets

ADJUSTABLE PACKAGE TRAY FOR RECLINING/FOLDING REAR SEATS

FIELD OF THE INVENTION

The present invention generally relates to an adjustable package tray for a vehicle and, more specifically, to an adjustable package tray for use in a vehicle having reclining/folding rear seats.

BACKGROUND OF THE INVENTION

Vehicle rear tray systems are generally disposed at a rear portion of a vehicle between the rear window of the vehicle and the rear seating of the vehicle. The vehicle tray package separates the trunk space from the interior cabin.

SUMMARY OF THE INVENTION

One aspect of the present invention includes a vehicle package tray assembly having a horizontal member disposed in a back portion of a vehicle. A tray cover is adjacent the horizontal member. The tray cover includes a rear substrate that extends over the horizontal member. A front substrate is slidably engaged with the rear substrate and adapted for abutment with a seat back. A spring-biased member is disposed between the horizontal member and the front substrate.

Another aspect of the present invention includes a vehicle package tray assembly for use with a foldable vehicle seat back. The seat back is in spaced relation from a rear wall of the seat back. A spring-biased tray cover is adjacent the seat back support and adapted to abut the rear wall of the seat back. The tray cover is positionable between a retracted position, wherein the tray cover abuts the reclined seat back, and an extended position.

Another aspect of the present invention includes a vehicle package tray assembly having a horizontal member disposed in a rear portion of a vehicle behind a vehicle seat. A tray cover is disposed over the horizontal member and includes a front substrate slidably associated with a rear substrate. The front substrate is movable between forward and rearward positions. The vehicle seat is movable between a reclined position and a folded position.

Yet another aspect of the present invention includes an adjustable package tray 10 that provides an aesthetically pleasing cover to the back portion of a vehicle. The adjustable package tray includes functionality that allows for the rear vehicle seat to move between an upright position, recline position, and folded position. The seat back of the rear vehicle seat may be moved to a variety of positions to provide comfort to a user as well as provide accessibility to the cargo area or truck of the vehicle.

These and other aspects, objects, and features of the present invention will be understood and appreciated by those skilled in the art upon studying the following specification, claims, and appended drawings.

DETAILED DESCRIPTION OF EMBODIMENTS

Figure 1:
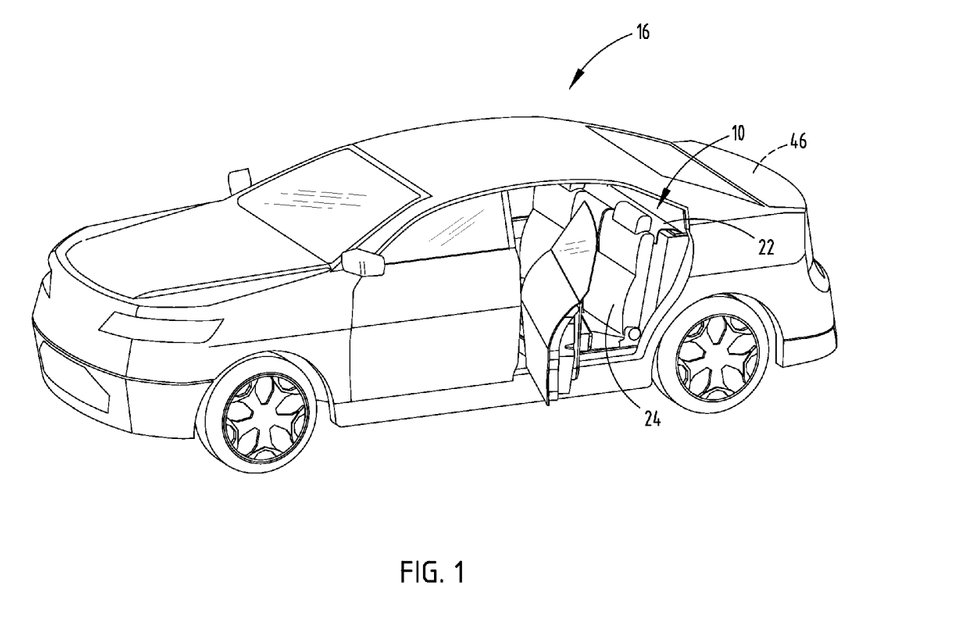
FIG. 1 is a top perspective view of a vehicle incorporating one embodiment of an adjustable package tray of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4C, the reference numeral 10 generally designates a vehicle package tray having a horizontal member 12 extending across a back portion 14 of a vehicle 16. A tray cover 18 is adjacent the horizontal member 12. The tray cover 18 includes a rear substrate 20 that extends over the horizontal member 12. A front substrate 22 is slidably engaged with the rear substrate 20 and adapted for abutment with a seat back 24. A spring-biased member 26 is in abutting contact with the front substrate 22 and the seat back 24.

The vehicle package tray 10 is designed for use with the rear vehicle seats 24 of the vehicle 16. The vehicle package tray 10 is generally designed to provide an aesthetic appearance to the rear portion of the vehicle 16 regardless of the position of the rear vehicle seats 24. The adjustability of the vehicle package tray 10 allows the rear vehicle seats 24 to move to a variety of positions while maintaining an aesthetically pleasing appearance. The rear vehicle seats 24 include seat backs 32 that abut the front substrate 22. The seat backs include headrests 33 that are disposed above the seat backs 32. The front substrate 22 includes a vertical portion 36 and a horizontal portion 38 that is generally arcuate. The seat backs 32 are generally designed to abut the vertical portion 36. Notably, the rear substrate 22 is generally stationary, while the front substrate 22 is mobile and designed to slide over the rear substrate 20.

Figure 2A:
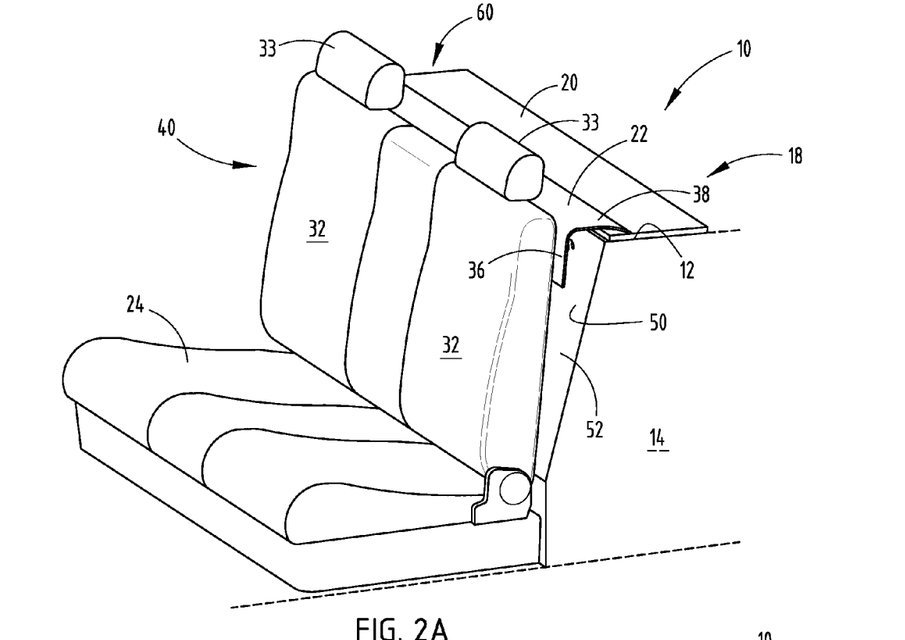
FIG. 2A is a top perspective view of a rear seating assembly and adjustable package tray with the seating assembly in an upright position.
Figure 3A:
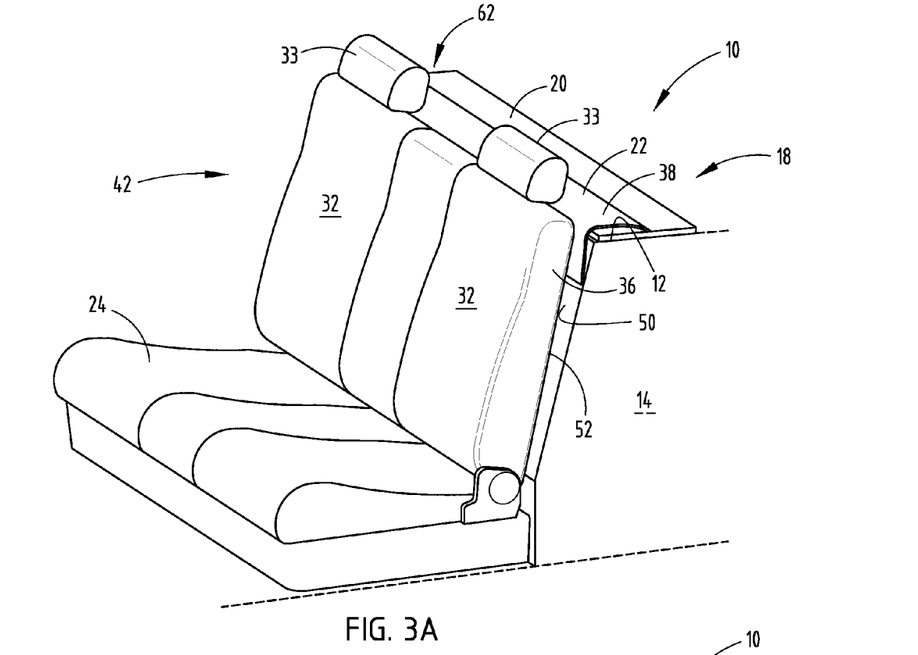
FIG. 3A is a top perspective view of a rear seating assembly and adjustable package tray with the seating assembly in a reclined position.
Figure 4A:
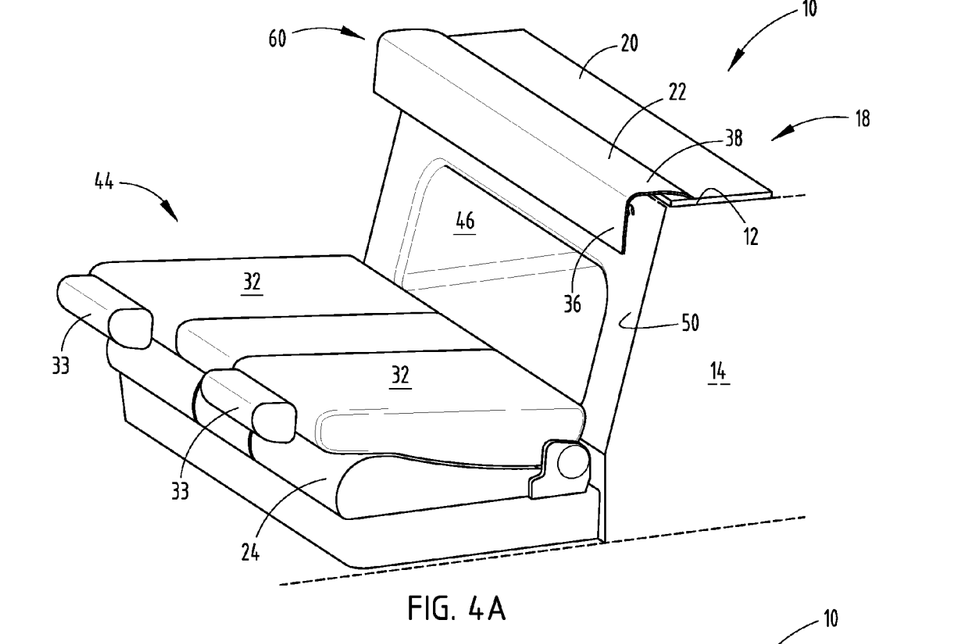
FIG. 4A is a top perspective view of a rear seating assembly and adjustable package tray with the seating assembly in a folded position.

Referring now to FIGS. 2A, 3A, and 4A, the rear vehicle seat 24 is movable between an upright position 40, a reclined position 42, and a folded position 44. The upright position 40 and the reclined position 42 (FIGS. 2A and 3A, respectively) are generally designed to support occupants in an interior cabin of the vehicle 16 when traveling. In the upright position 40 and the reclined position 42, the seat backs 32 abut the front substrate 22. The rear vehicle seats 24 include standard functionality to provide substantial comfort to the rear occupants. As shown in FIG. 4A, the rear vehicle seats 24 may also be rotated downward to a folded position 44, wherein access to a trunk 46 of the vehicle 16 is possible. In the folded position 44, the seat backs 32 do not abut the front substrate 22. Access to the vehicle trunk 46 is useful when the size of cargo exceeds the size of the trunk 46. Access to the vehicle trunk 46 is also useful when access to the trunk 46 is desirable from the interior cabin.

Figure 2B:
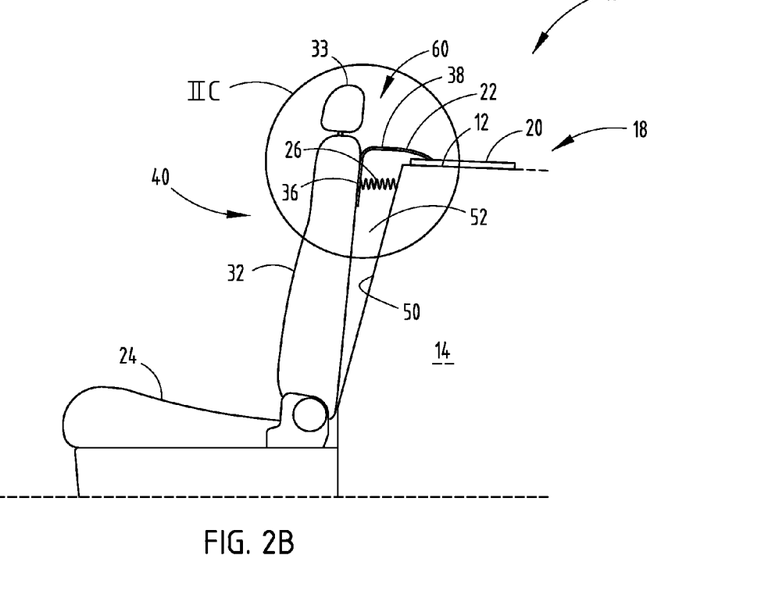
FIG. 2B is a side elevational view of the vehicle seating assembly of FIG. 2A.
Figure 2C:
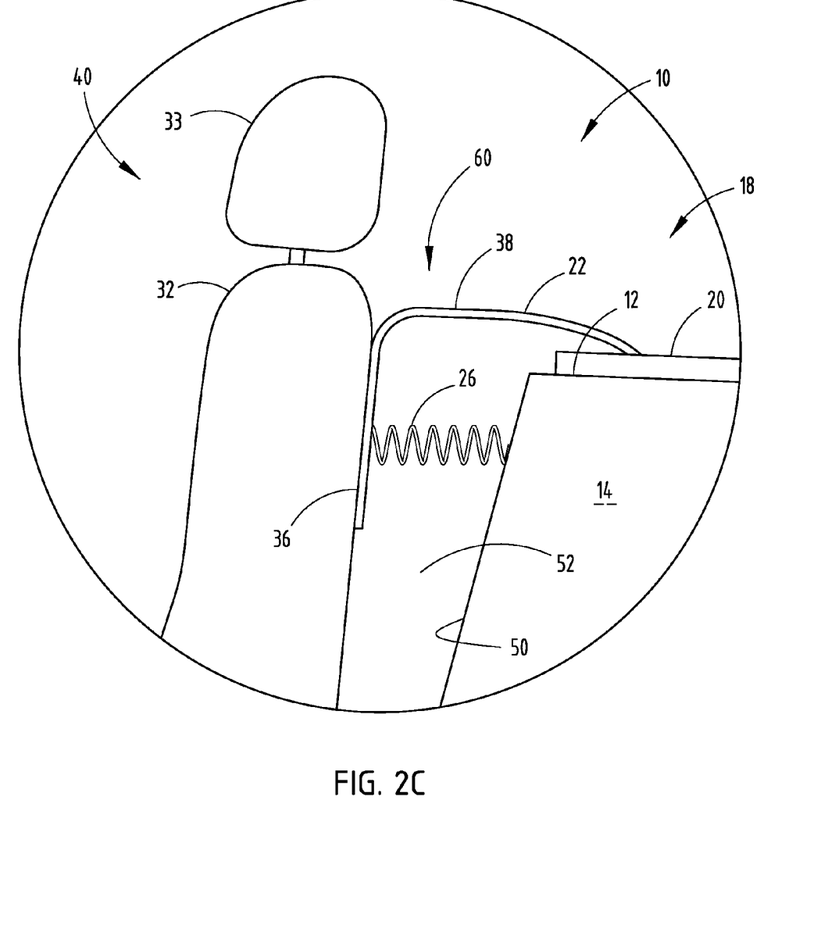
FIG. 2C is an enlarged side elevational taken at area IIC of FIG. 2B.

As shown in FIGS. 2A-2C, in the upright position 40, the seat backs 32 are spaced a predetermined distance from a seat back support 50 proximate the back portion 14 of the vehicle, but in abutting contact with the front substrate 22. The seat backs 32 and seat back support 50 generally define a cavity 52. The spring-biased member 26 is positioned between the front substrate 22 and the back portion 14 in the cavity 52. The spring-biased member 26 generally urges the front substrate to a forward position. In the illustrated embodiment, the spring-biased member 26 is a compression spring. However, it will be understood that other biasing members such as leaf springs, resilient polymers, etc. could also be used. The general locations of the seat backs 32, front substrate 22 and rear substrate 20 cover the horizontal member 12 disposed over the back portion 14 of the vehicle 16. Notably, although the seat backs 32 abut the vertical portion 36 of the front substrate 22, the seat backs 32 are not permanently fastened to any portion of the front substrate 22.

Figure 3B:
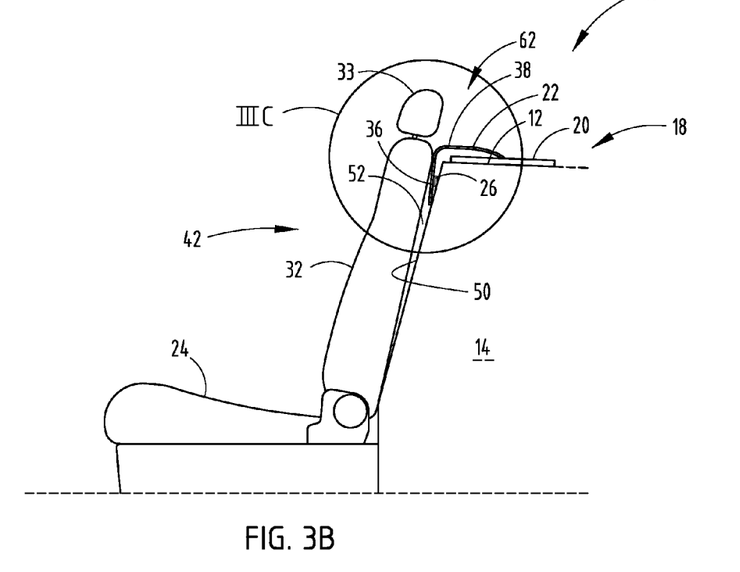
FIG. 3B is a side elevational view of the vehicle seating assembly of FIG. 3A.
Figure 3C:
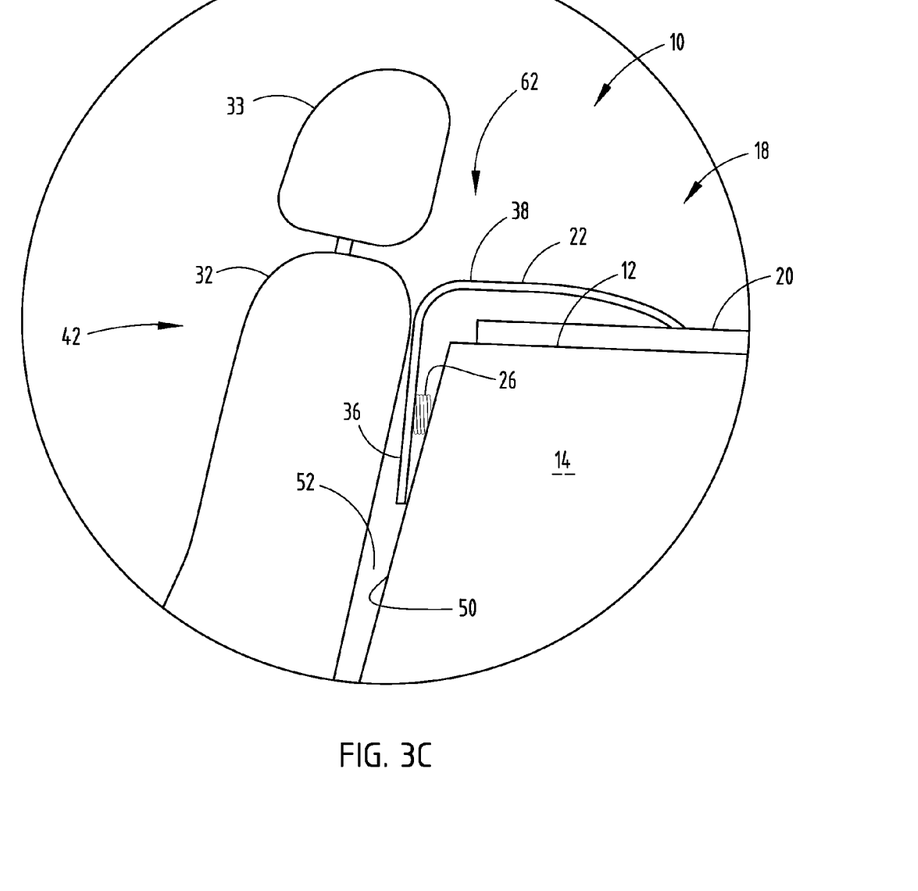
FIG. 3C is an enlarged side elevational taken at area IIIC of FIG. 3B.

Referring now to FIGS. 3A-3C, as mentioned above, the rear seat back 32 is reclinable to provide additional comfort to an occupant. Specifically, as shown in FIGS. 3A-3C, the vehicle seat back 32 is reclinable against the vertical portion 36 of the front substrate 22. Accordingly, as the vehicle seat back 32 reclines, the vertical portion 36 of the front substrate 22 slides against the seat back 32 as the front substrate simultaneously moves rearward. Simultaneously, the horizontal portion 38 of the front substrate 22 slides over the rear substrate 20. It is contemplated that the front substrate 22 and rear substrate 20 may interface directly and include a low coefficient of friction material to minimize binding or lockup. Alternately, the front substrate 22 and rear substrate 20 may include rollers, bearings, etc. which assist the horizontal portion 38 of the front substrate 22 slide over the rear substrate 20. During movement of the front substrate, the spring-biased member 26 is compressed and the horizontal portion 38 of the front substrate 22 is slid rearwardly.

Referring again to FIGS. 2A-3C, it is contemplated that the vehicle seat back 32 may be reclined to any of a variety of positions between the fully upright position 40 and the fully reclined position 42. Notably, the spring-biased member 26 keeps the vertical portion 36 of the front substrate 22 in constant abutment with the vehicle seat back 32 between the full upright position 40 and the fully reclined position 42. Thus, there is no gap between the vehicle seat back 32 and the tray cover 18, resulting in a smooth and apparently seamless transition from the vehicle seat back 32 to the vehicle package tray 10. The vehicle seat back 32 is supported against the back support 31 that limits the amount that the rear vehicle seats 24 can recline. Further, because there is no fixed connection between the seat back 32 and the vertical portion 36 of the front substrate, the seat back 32 can freely recline against the spring force of the spring-biased member 26.

Figure 4B:
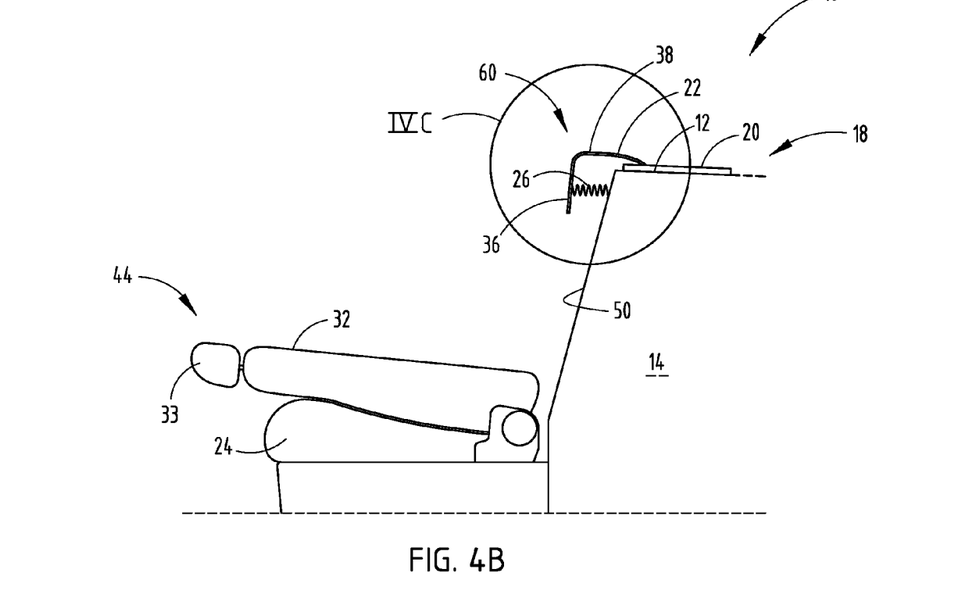
FIG. 4B is a side elevational view of the vehicle seating assembly of FIG. 4A.
Figure 4C:
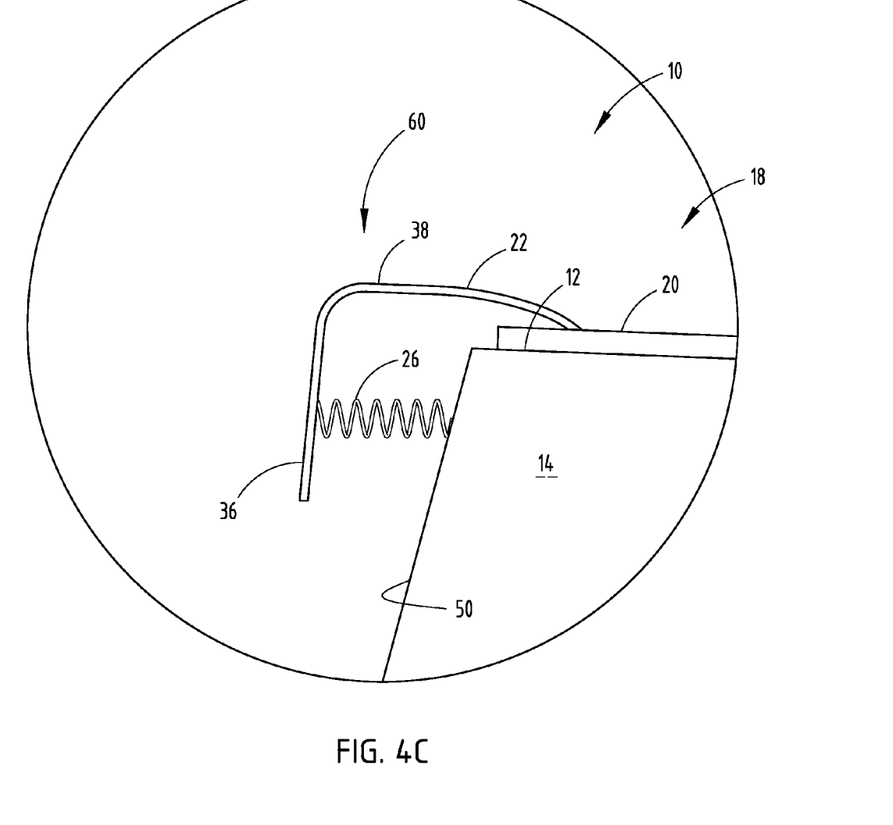
FIG. 4C is an enlarged side elevational taken at area IVC of FIG. 4B.

Referring now to FIGS. 4A-4C, the vehicle seat back is also movable to the folded position 44. Because the vehicle package tray 10 is not in fixed connection with the vehicle seat back 32, the vehicle seats 24 may be folded downward to the folded position 44 such that access to the cargo area or trunk 46 of the vehicle 16 is possible. When the rear vehicle seats 24 are folded downward, the spring-biased member 26 is in an uncompressed position 60 (FIG. 2C) corresponding with a forward position of the front substrate 22 of the vehicle package tray 10. When the front substrate 22 is in the forward position, the package tray 10 is in an extended position. When the vehicle seats 24 are in the upright position, the spring-biased member 26 is still in the uncompressed position 60 and the package tray 10 is in the extended position. It is generally contemplated that the spring-biased member 26 may be slightly compressed between the vertical portion 36 of the front substrate 22 and the back wall 50. When the vehicle seats 24 are moved to the reclined position 42, the spring-biased member 26 moves to a compressed position 62 (FIG. 3C) corresponding to a rearward position of the front substrate 22 of the vehicle package tray 10. When the front substrate 22 is in the rearward position, the package tray 10 is in a retracted position. The spring-biased member 26 may provide some force against the seat backs 32 to urge the seat back 32 forward so that the rear vehicle seats 24 may assume the upright position 40. In this case, a locking assembly is installed on the rear vehicle seat 24 so that a user can maintain the rear vehicle seat 24 in the reclined position 42 if desired. It is contemplated that one of the vehicle seat backs 32 may be in the upright position 40 or reclined position 42 while the other of the vehicle seat backs 32 is in the folded position 44. In this case, the vehicle seat back 32, when in the upright position 40 or reclined position 42, maintains contact with the vertical portion 36 of the front substrate 22, while the vehicle seat back 32 that is in the folded position 44 does not.

The adjustable package tray 10 as disclosed herein provides an aesthetically pleasing cover to the back portion 14 of the vehicle 16. The adjustable package tray 10 includes functionality that allows for the rear vehicle seat 24 to move between the upright position 40, recline position 42 and folded position 44. More specifically, the seat back 32 of the rear vehicle seat 24 may be moved to a variety of positions to provide additional comfort to a user as well as provide accessibility to the cargo area or truck 46 of the vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle package tray assembly comprising:
   a horizontal member disposed in a back portion of a vehicle;
   a tray cover adjacent the horizontal member and including:
      a rear substrate that extends over the horizontal member; and
      a front substrate slidably engaged with the rear substrate and adapted for abutment with a seat back; and
   a spring-biased member in abutting contact with the front substrate and a seat back support located behind the seat back.

2. The vehicle package tray assembly of claim 1, wherein the front substrate covers the spring-biased member.

3. The vehicle package tray assembly of claim 1, wherein the front substrate is spring-biased to a forward position.

4. The vehicle package tray assembly of claim 1, wherein the front substrate includes a substantially vertical portion and a substantially horizontal portion.

5. The vehicle package tray assembly of claim 1, wherein the spring-biased member includes a compression spring.

6. A vehicle package tray assembly comprising:
a foldable vehicle seat back;
a seat back support in spaced relation from a rear wall of the seat back; and
a spring-biased tray cover adjacent the seat back support and adapted to abut the rear wall of the seat back, wherein the tray cover is positionable between a retracted position corresponding with a reclined position of the seat back, and an extended position.

7. The vehicle package tray assembly of claim 6, wherein the spring-biased tray cover is spring-biased to the extended position.

8. The vehicle package tray assembly of claim 6, wherein the spring-biased tray cover includes a substantially stationary rear substrate and a substantially mobile front substrate.

9. The vehicle package tray assembly of claim 8, wherein the front substrate includes a substantially vertical portion and a substantially horizontal portion.

10. The vehicle package tray assembly of claim 9, further comprising:
a spring-biased member disposed between the front substrate and the seat back support.

11. The vehicle package tray assembly of claim 10, wherein the spring-biased member includes a compression spring.

12. A vehicle package tray assembly comprising:
a seat back support disposed in a rear portion of a vehicle behind a vehicle seat back;
a tray cover disposed over the back support and having a front substrate slidably associated with a rear substrate, and wherein the front substrate is movable between forward and rearward positions, and wherein the vehicle seat back is movable between a reclined position and a folded position.

13. The vehicle package tray assembly of claim 12, wherein the front substrate is spring-biased to the forward position.

14. The vehicle package tray assembly of claim 12, wherein the front substrate includes an arcuate horizontal portion.

15. The vehicle package tray assembly of claim 12, wherein the seat back and seat back support define a cavity.

16. The vehicle package tray assembly of claim 15, further comprising:
a spring-biased member disposed in the cavity.

17. The vehicle package tray assembly of claim 16, wherein the spring-biased member includes a compression spring.

* * * * *